United States Patent
Park et al.

(10) Patent No.: US 9,825,774 B2
(45) Date of Patent: Nov. 21, 2017

(54) METHOD OF SHARING USAGE INFORMATION, AND APPARATUS AND SYSTEM THEREOF

(75) Inventors: Jung-shin Park, Suwon-si (KR);
Kwang-hyuk Kim, Suwon-si (KR);
Jun-ho Jang, Hwaseong-si (KR);
Jin-yong Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 851 days.

(21) Appl. No.: 12/271,266

(22) Filed: Nov. 14, 2008

(65) Prior Publication Data
US 2009/0307228 A1 Dec. 10, 2009

(30) Foreign Application Priority Data
Jun. 4, 2008 (KR) ........................ 10-2008-0052655

(51) Int. Cl.
*G06F 17/30* (2006.01)
*H04L 12/28* (2006.01)
*H04L 29/08* (2006.01)

(52) U.S. Cl.
CPC .... *H04L 12/2825* (2013.01); *G06F 17/30038* (2013.01); *H04L 67/125* (2013.01);
(Continued)

(58) Field of Classification Search
CPC ............................................. G06F 17/30038
(Continued)

(56) References Cited

U.S. PATENT DOCUMENTS 7,840,977 B2 * 11/2010 Walker ............... H04N 21/4334
348/441
2003/0097419 A1 5/2003 Pradham
(Continued)

FOREIGN PATENT DOCUMENTS

| CN | 1689367 A | 10/2005 |
| CN | 1745374 A | 3/2006 |
| WO | 2007008503 A2 | 1/2007 |

OTHER PUBLICATIONS

Communication dated Jan. 28, 2013 issued by the State Intellectual Property Office of P.R. China in counterpart Chinese Application No. 200810183780.2.

(Continued)

*Primary Examiner* — Chelcie Daye
(74) *Attorney, Agent, or Firm* — Sughrue Mion, PLLC

(57) ABSTRACT

Provided are a method, apparatus, and system for sharing usage information of daily life. Usage information sharing system includes: a first home network including at least one electronic device generating metadata with respect to human behavior; a first collecting device collecting metadata with respect to usage information from first home network; a second collecting device transmitting metadata of first home network that is received from the first collecting device to a second home network; and a second home network comprising at least one electronic device receiving the metadata from the second collecting device and performing an operation corresponding to the metadata. Accordingly, behavioral actions of a person in daily life can be dynamically recognized via a home network and home electronic devices and converted into metadata, and transmitted to another home network in real-time via a network. Thus, the experiences and feelings of a user can be dynamically shared.

22 Claims, 7 Drawing Sheets

(52) U.S. Cl.
CPC ........ *H04L 67/22* (2013.01); *H04L 2012/285* (2013.01); *H04L 2012/2849* (2013.01)

(58) Field of Classification Search
USPC .......................... 707/10, 101, 687; 725/9, 38
See application file for complete search history.

(56) References Cited

U.S. PATENT DOCUMENTS

| | | | |
|---|---|---|---|
| 2003/0140185 A1* | 7/2003 | Cherry ................... | G06Q 30/06 710/15 |
| 2005/0257006 A1 | 11/2005 | Yoshida et al. | |
| 2006/0288407 A1 | 12/2006 | Naslund et al. | |
| 2007/0009235 A1* | 1/2007 | Walters .............. | H04N 21/6581 386/278 |
| 2007/0156521 A1* | 7/2007 | Yates ................... | G06Q 10/101 705/300 |
| 2007/0157220 A1* | 7/2007 | Cordray ................. | H04H 60/65 725/9 |
| 2007/0157234 A1 | 7/2007 | Walker | |
| 2011/0016231 A1 | 1/2011 | Ramaswamy et al. | |

OTHER PUBLICATIONS

Communication dated Nov. 15, 2013 issued by the State Intellectual Property Office of the People's Republic of China in counterpart Chinese Patent Application No. 200810183780.2.

Communication dated Apr. 28, 2014 from the State Intellectual Property Office of P.R. China in a counterpart application No. 200810183780.2.

Communication dated Jul. 21, 2014 issued by the Korean Intellectual Property Office in counterpart Korean Patent Application No. 10-2008-0052655.

Communication dated Jan. 13, 2015 issued by the Korean Patent Office in counterpart Korean Patent Application No. 10-2008-0052655.

Communication dated Nov. 27, 2015, issued by the State Intellectual Property Office of P.R. China in counterpart Chinese Application No. 200810183780.2.

Communication dated Jul. 24, 2015 issued by the State Intellectual Property Office of the People's Republic of China in counterpart Chinese Patent Application No. 200810183780.2.

* cited by examiner

METHOD OF SHARING USAGE INFORMATION, AND APPARATUS AND SYSTEM THEREOF

CROSS-REFERENCE TO RELATED PATENT APPLICATION

This application claims the benefit of Korean Patent Application No. 10-2008-0052655, filed on Jun. 4, 2008 in the Korean Intellectual Property Office, the disclosure of which is incorporated herein in its entirety by reference.

BACKGROUND OF THE INVENTION

1. Field of the Invention

The present invention relates to a home network including an electronic device, and more particularly, to a method and apparatus for sharing information regarding usage of a home network with a user of another home network.

2. Description of the Related Art

It had been long predicted that users would pursue isolation from other users in digital environments as digital technology develop. However, while users' isolation phenomenon keeps intensifying, there are lots of users still desiring to use digital technology to share their own experiences and feelings with others, for human beings are social animals.

Increase of such demands is reflected in the fact that the usage of social network services is increasing exponentially, as can be seen from CYWORLD of South Korea or MYSPACE of the U.S.A. Also, new service trends are found to reflect the demand of users, and Web 2.0 is one example of the new service trends, which is oriented to participation and sharing.

The ways in which one's experiences and feelings can be shared have been continuously developed allowing sharing via text, music, drawing, photographs, moving images, etc., and demand of users for sharing of experiences and feelings is predicted to increase further. Accordingly, besides the conventional method of sharing experiences and feelings simply through media (or contents) like photographs or moving images, a new method of sharing experiences and feelings will be needed.

SUMMARY OF THE INVENTION

The present invention provides a method and apparatus suitable for sharing human behavior, e.g., usage information, usage data or usage patterns, with regards to digital devices of a person in a home network of a user with other people in other home networks, thereby enabling sharing of experiences and feelings among people. Herein, the human behavior is recognized using a digital electronic device in a home network, and is shared with other people in other home networks by converting the recognized human behavior into metadata, and broadcasting the metadata.

According to an aspect of the present invention, there is provided a method of providing metadata regarding human behavior, the method comprising: obtaining human behavior data by monitoring behavior of a user; converting the human behavior data into metadata; and transmitting the metadata to a home network.

According to another aspect of the present invention, there is provided a method of sharing human behavior, the method comprising: receiving metadata about human behavior; transmitting the metadata to a home network; selecting the metadata; and performing an operation corresponding to the selected metadata.

According to another aspect of the present invention, there is provided a system of sharing human behavior, comprising: a first home network comprising at least one electronic device generating metadata with respect to human behavior; a first collecting device collecting the metadata with respect to human behavior from the first home network; a second collecting device transmitting the metadata of the first home network that is received from the first collecting device to a second home network; and a second home network comprising at least one electronic device receiving the metadata from the second collecting device and performing an operation corresponding to the metadata.

According to another aspect of the present invention, there is provided a computer readable recording medium having embodied thereon a program for executing a method of providing metadata, wherein the method comprises: obtaining human behavior data by monitoring human behavior of a user; converting the human behavior into metadata; and transmitting the metadata to a home network.

According to another aspect of the present invention, there is provided a computer readable recording medium having embodied thereon a program for executing a method of sharing human behavior, wherein the method comprises: receiving metadata with respect to human behavior data; transmitting the metadata to a home network; selecting the metadata; and performing an operation corresponding to the selected metadata.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

The present invention provides a method of sharing usage information of a user during the user's daily life, which enables sharing data regarding usage information of a user with respect to digital devices that is collected through a home networking device, with a user of another home network in real-time. Also, the user may record one's own or other's usage information and realize the usage information later.

For example, imagine Hong Kildong turns on the TV in his living room, changes channels, and then goes to the home library and turns on the computer to watch moving images, and then goes to his bedroom because he has become tired and starts listening to music with his MP3 player. The actions of Hong Kildong with respect to the use of each electronic device are converted into metadata and sent to the home of Hong Kildong's mother and the same actions and corresponding digital conditions are recreated in the home of Hong Kildong's mother.

Also, Hong Kildong may store metadata with respect to his own actions in a home network collecting device, as if using a DVR (digital video recorder), and may execute the stored metadata later when he wants and realize his past actions to recollect the past.

In the same way, Hong Kildong's mother may obtain the metadata with respect to the actions of Hong Kildong and store the metadata in her home network (or a third home network) to execute the metadata repeatedly when she wants.

This technique allows families or couples who live far from each other to share device usage in their daily life, and thereby to maintain sense of kinship despite the geographical or temporal distance.

The present invention will now be described more fully with reference to the accompanying drawings, in which exemplary embodiments of the invention are shown.

Figure 1:
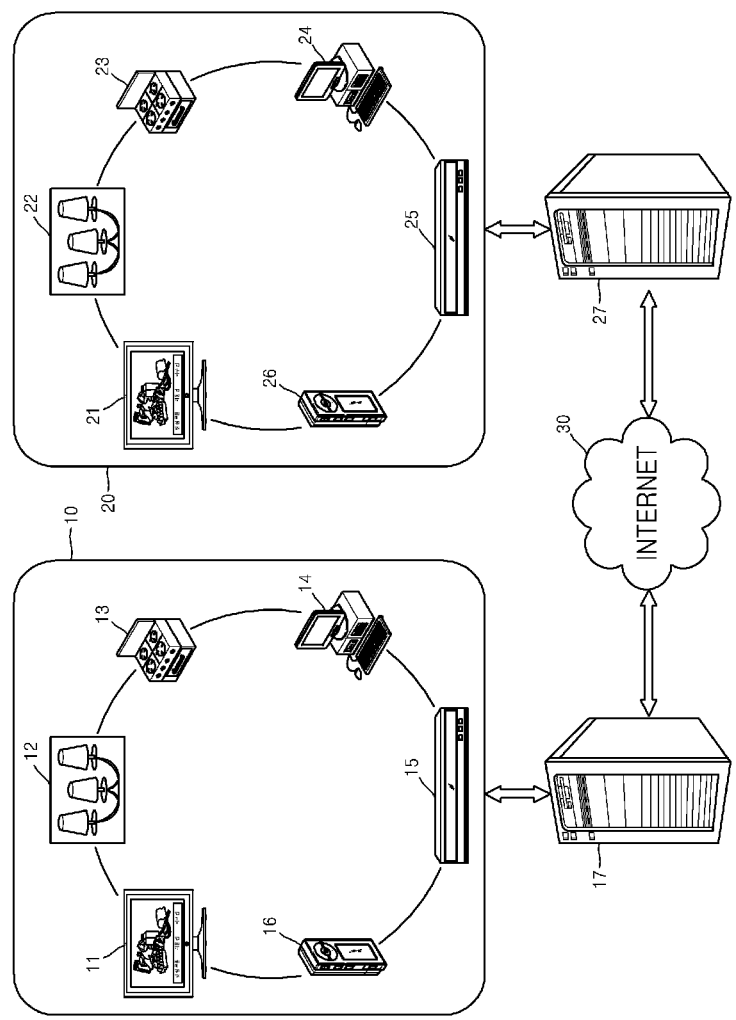
FIG. 1 illustrates a usage information sharing system according to an embodiment of the present invention.

FIG. 1 illustrates a system of sharing usage information according to an embodiment of the present invention. The system of sharing usage information is divided into a first home network 10, a first collecting device 17, a second home network 20, a second collecting device 27, and a network 30.

The first home network 10 includes various digital electronic devices 11 through 16. Electronic devices included in the current embodiment of the present invention need to be understood as all kinds of digital devices with which data about actions can be shared. That is, examples of the electronic devices include a multi-media player (or A/V player) 11 and 16, a personal computer 14, a heating/cooling controller 15, a multimedia recording device, a scent generating device, and also electric devices such as a lamp 12, an electric heater 13, a vibration generating device, etc.

The electronic devices 11 through 16 are connected to one another in various communication connection modes such as a PAN (personal area network), IEEE 1394 bus, cable, Ethernet, and so forth, to constitute one home network.

The second home network 20 also includes various electronic devices 21 through 26 like the first home network 10.

The first metadata collecting device 17 and the second metadata collecting device 27 are respectively electrically connected to the first home network 10 and the second home network 20. The first metadata collecting device 17 and the second metadata collecting device 27 transmit and receive metadata with respect to the actions occurring in their respective home networks to and from each other via a network 30. The network 30 may be LAN, internet, and so forth.

In FIG. 1, the first collecting device 17 or the second collecting device 27 is physically separate from the first home network 10 or the second home network 20; however, in another embodiment, the first collecting device 17 (or the second collecting device 27) may be realized as a part of an electronic device of the first home network 10 (or the second home network 20).

Figure 2:
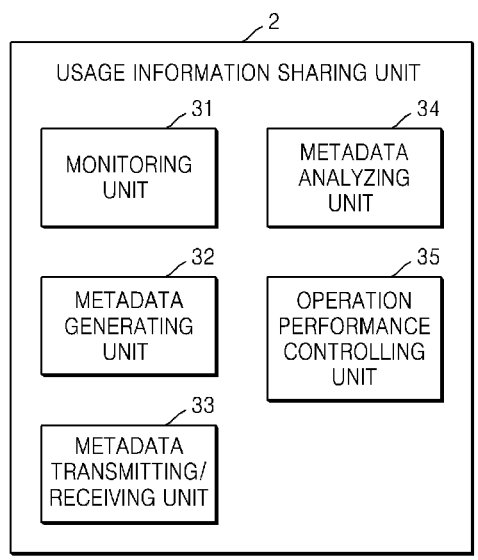
FIG. 2 illustrates a usage information sharing apparatus according to an embodiment of the present invention.

FIG. 2 illustrates a usage information sharing apparatus 2 according to an embodiment of the present invention. The usage information sharing apparatus 2 may be realized using the electronic devices 11 through 16 and 21 through 26. The usage information sharing apparatus 2 includes a monitoring unit 31, a metadata generating unit 32, a metadata transmitting/receiving unit 33, a metadata analyzing unit 34, and an operation performance controlling unit 35.

The metadata generating unit 32 generates metadata with respect to the usage of the user by encoding usage data that is sensed by the monitoring unit 31. That is, metadata is generated when a function of a device is changed or when a device setting is changed and the metadata is written as binary data or by using XML. The metadata may be generated so as to conform with standards regarding digital electronic devices like MPEG, OCAP, and OIF.

Figure 3:
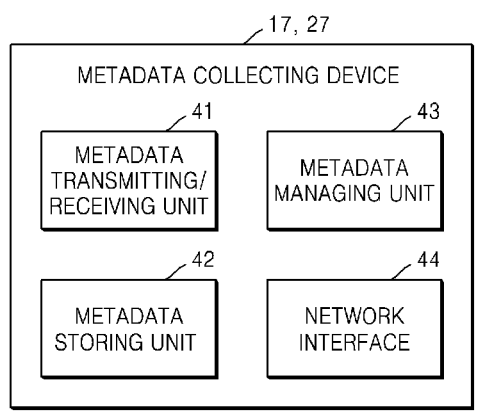
FIG. 3 is a functional block diagram showing a detailed configuration of metadata collecting devices according to an embodiment of the present invention.

FIG. 3 is a functional block diagram showing a detailed configuration of metadata collecting devices 17 and 27 according to an embodiment of the present invention.

The metadata collecting devices 17 and 27 include a metadata transmitting and receiving unit 41, a metadata storing unit 42, a metadata managing unit 43, and a network interface 44.

Figure 4:
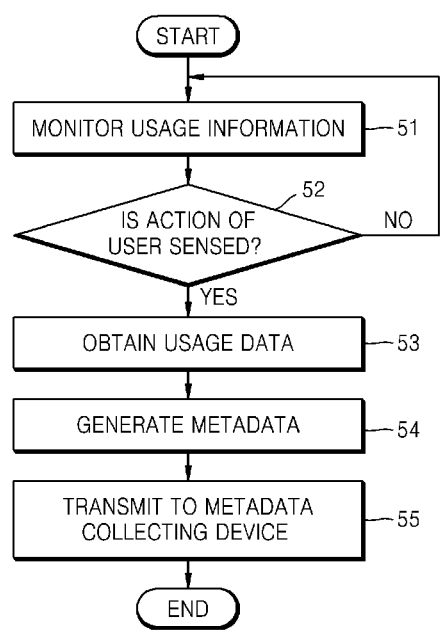
FIG. 4 is a flowchart illustrating a method of providing metadata regarding the usage information according to an embodiment of the present invention.

FIG. 4 is a flowchart illustrating a method of providing metadata regarding the usage information according to an embodiment of the present invention. The method illustrated in FIG. 4 is performed using the usage information sharing apparatus 2 included in each of the electronic devices 11 through 16, and 21 through 26.

First, the monitoring unit 31 monitors usage information of a user with respect to the electronic devices in operation 51.

When the monitoring unit 31 senses selection of a function of the electronic device or setting change of the electronic device through an input portion of the electronic device in operation 52, digital usage information data with respect to the selection of a function of the electronic device or setting change of the electronic device is obtained in operation 53. If the electronic device is an MP3 player, the monitoring unit 31 searches which function, for example, play, stop or pause, is selected by the user, and when the device setting is changed, which setting, for example, equalizer, volume, etc. is changed. If the electronic device is a TV, the monitoring unit 31 searches which operation the user has selected, for example, channel change and the number of the changed channel, and when the device setting is changed, the monitoring unit 31 searches which setting item, for example, brightness, is changed.

In operation 54, the metadata generating unit 32 converts (or encodes) the digital usage information data obtained in operation 53 into a format that can be understood by other electronic device to generate metadata about the usage. The metadata is designed to include information on the electronic device which has collected the digital usage information data, information such as the type of the electronic device, the manufacturer, the model number, etc.

The metadata is sent to the other one of the metadata collecting devices 17 and 27 via the metadata transmitting and receiving unit 33 in operation 55.

Figure 5:
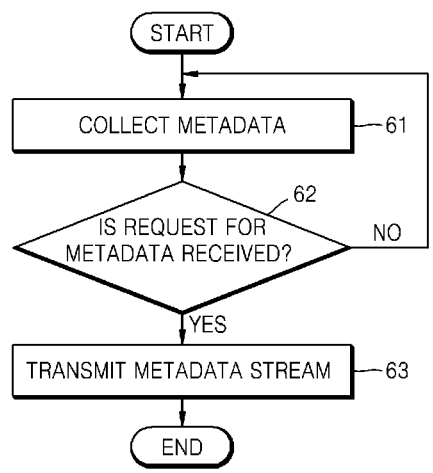
FIG. 5 is a flowchart illustrating a method of providing metadata regarding usage information, performed using the metadata collecting devices.

FIG. 5 is a flowchart illustrating a method of providing metadata regarding usage, performed using the metadata collecting devices 17 and 27.

The metadata collecting device, for example, a first collecting device, collects metadata of the digital usage information data generated using the electronic devices 11 through 16 of the first home network 10 in operation 61.

That is, the metadata managing unit 43 keeps in contact with the electronic device, and when metadata with respect to digital usage information involving the electronic device is generated, the metadata managing unit 43 receives the metadata via the metadata transmitting/receiving unit 41 and stores the metadata in the metadata storing unit 42.

If the first collecting device receives a request for usage information metadata from another collecting device, for example, from a second collecting device, the metadata managing unit 43 of the first collecting device transmits metadata to the second collecting device in real-time via the network 30, preferably by using a streaming method, in operations 62 and 63.

Figure 6:
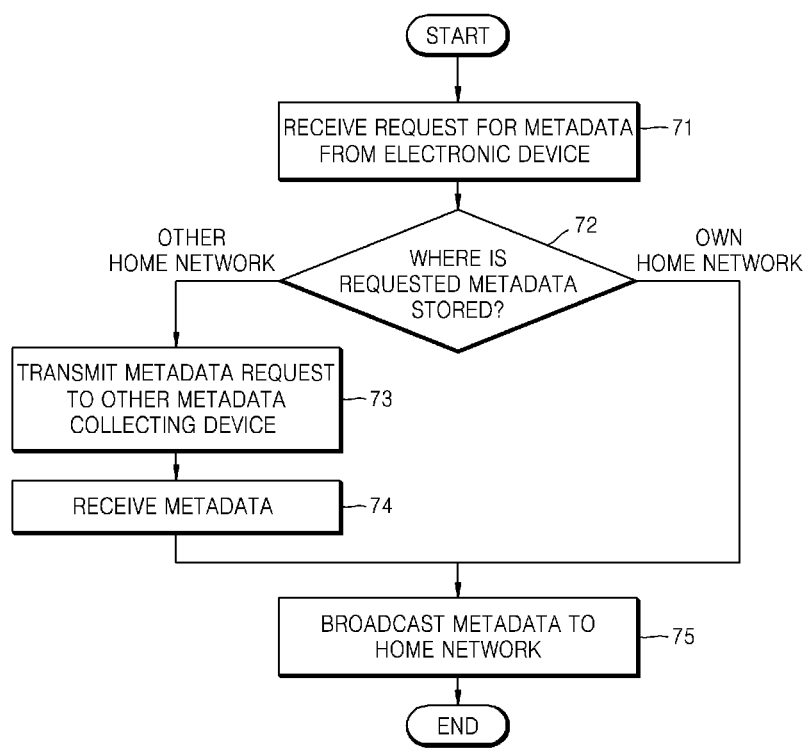
FIG. 6 is a flowchart illustrating a method of sharing metadata performed by the metadata collecting devices.

FIG. 6 is a flowchart illustrating a method of sharing metadata performed by the metadata collecting devices.

For example, when the second collecting device receives a request for metadata from the electronic devices 21 through 26 included in the second home network 20, the metadata managing unit 43 of the second collecting device analyzes the request for the metadata in operation 71.

If it is determined in operation 72 that the metadata, which is requested by the electronic device 21 through 26, is metadata generated in the second home network 20, the requested metadata should be stored in the second collecting device and thus the metadata managing unit 43 detects metadata from the metadata storing unit 42 to broadcast the metadata to the second home network 20 in operation 75.

On the other hand, when it is determined in operation 72 that the metadata requested by the electronic devices 21 through 26 is metadata generated in the first home network, the metadata managing unit 43 has conversation with the metadata managing unit 43 of the first collecting device in operation 73, and obtains metadata from the first collecting device in operation 74.

Then the obtained metadata is broadcast to the second home network 20 in operation 75.

Figure 7:
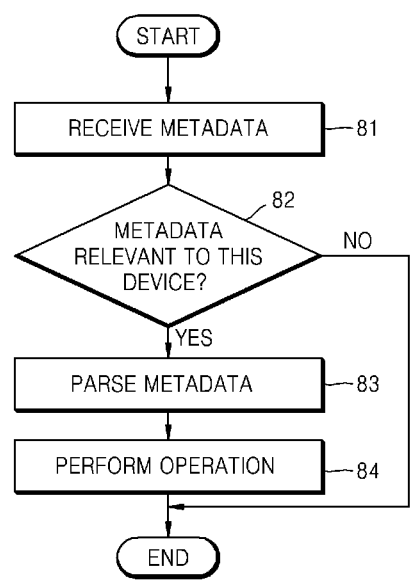
FIG. 7 is a flowchart illustrating a method of sharing usage information performed by an electronic device.

FIG. 7 is a flowchart illustrating a method of sharing usage information performed by an electronic device.

First, for example, when the metadata is broadcast to the second home network by the second collecting device, the electronic devices 21 through 26 in the second home network 20 receive the metadata in operation 81.

The metadata analyzing unit 34 of each of the electronic devices judges whether the received metadata is relevant to itself. For example, when the MP3 player 26 of the second home network has received metadata, the MP3 player 26 judges whether the received metadata is generated by the MP3 player 16 of the first home network, which is of the same kind as itself, in operation 82.

If the received metadata is relevant to the device, the metadata analyzing unit 34 parses or/and decodes the metadata in operation 83.

The operation performance controlling unit 35 performs a function or changes a device setting corresponding to the metadata based on the result of parsing metadata. For example, when the user of the first home network 10 has started to listen to a song using an MP3 player, then the MP3 player of the second home network 20 will also start to play the same song in operation 84.

In the methods described with reference to FIGS. 6 and 7, the second collecting device transmits the metadata to the home electronic devices of the second home network 20 using a broadcast method. However, according to another embodiment of the present invention, metadata may also be transmitted using a multicast or unicast methods.

Figure 8:
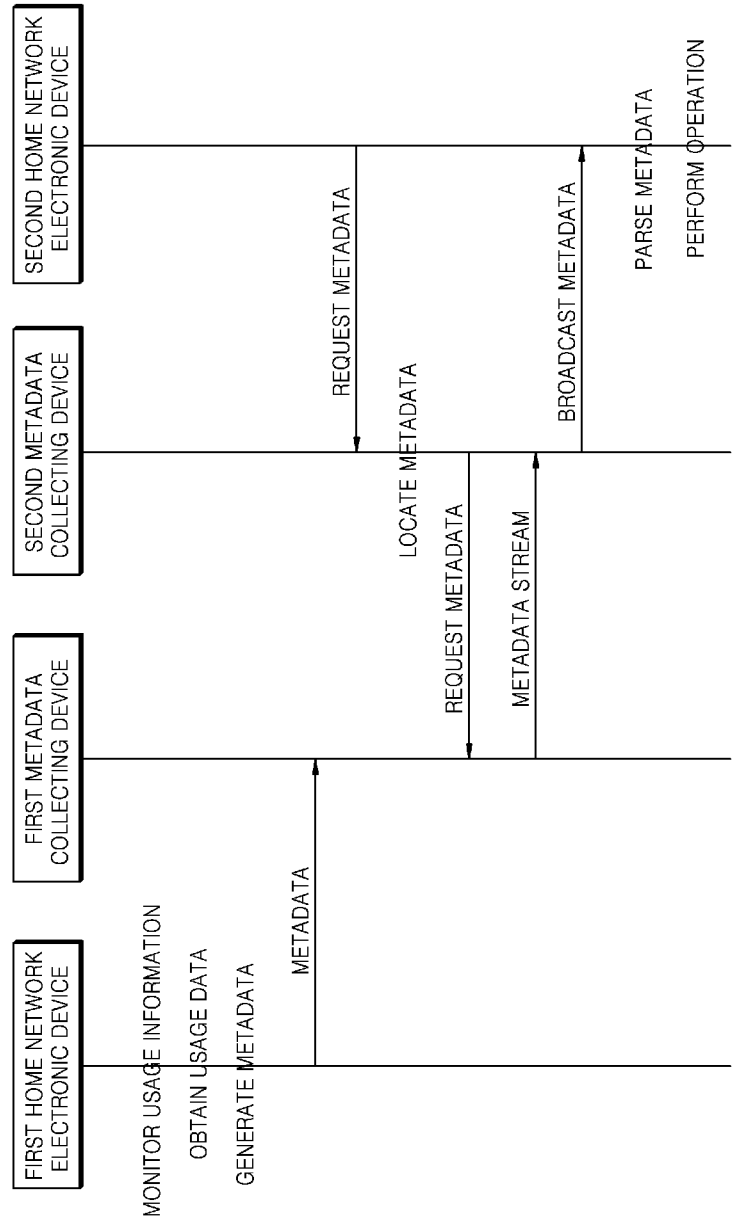
FIG. 8 illustrates all the methods of FIGS. 4 through 7 to show, in their order, the overall operations of the usage information sharing system of FIG. 1 of the present invention.

FIG. 8 sequentially illustrates the methods of FIGS. 4 through 7 to show an overall operation of the usage information sharing system of FIG. 1.

A method of sharing data regarding usage information with respect to digital devices between electronic devices using a usage information data collecting device, and an apparatus therefor have been described with reference to the above embodiments of the present invention. However, according to another embodiment of the present invention, the electronic devices may share digital usage information data without using a collecting device. In other words, an electronic device may be connected to another electronic device one to one through a wired or wireless network, to thereby share digital usage information data.

Sentences 1 and 2 below show examples of metadata regarding usage information according to the present invention.

[Sentence 1]

```
<smmdMetadata>
  <deviceInfo>
    <category>Audio Player</category>
    <manufacturer>Samsung</manufacturer>
    <modelName>YP-P2</modelName>
    <serialNumber>12E35R33A<serialNumber>
  </deviceInfo>
  <operation>
    <name>Channel Change</name>
    <valueList>
      <channelFrom>9</channelFrom>
      <channelTo>11</channelTo>
    </valueList>
  </operation>
</smmdMetadata>
```

Sentence 1 shows metadata generated according to the present invention when an electronic device is an audio player, and the user has changed a function thereof, that is, when the user has changed the channel.

Tag <deviceInfo> is information regarding the corresponding electronic device, including the category, the manufacturer, the model name, the serial number of the electronic device, and so forth.

Tag <operation> is information regarding the changed function of the electronic device, including the name of the function, the number of channel before and after the change (valuelist), etc.

[Sentence 2]

```
<smmdMetadata>
  <deviceInfo>
    <category>Audio Player</category>
    <manufacturer>Samsung</manufacturer>
    <modelName>YP-P2</modelName>
    <serialNumber>12E35R33A<serialNumber>
  </deviceInfo>
  <configuration>
    <name>equalizer</name>
    <valueList>
      <bass>8</bass>
      <middle>5</middle>
      <treble>7</treble>
    </valueList>
  </configuration>
</smmdMetadata>
```

Sentence 2 is an example of metadata generated according to the present invention where the electronic device is an audio player and the user has changed a device setting.

As in the case of Sentence 1, tag <deviceInfo> includes information regarding the corresponding electronic device.

Tag <configuration> is information regarding the changed device setting, including the name of the setting, the item value after the change, etc.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the conventional SMMD (single media multi device) technology connects media and a home network statically, in the usage information data sharing method according to the present invention, the happenings of one's daily life are recognized via home networks and home electronic devices and converted into metadata and transmitted to other home networks/people through a network, thereby enabling dynamic sharing of experiences and feelings.

The user of the home network can store the metadata regarding his or her usage information in the home network and execute the metadata later to reflect on past experiences or feelings of his or hers. Thus the apparatus and system for sharing digital usage information data can also be used as an album to record experiences and feelings.

Also, the method and apparatus for sharing usage information data according to the present invention can contribute to standardization of a home network including digital electronic devices.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing metadata regarding a user's usage of a first device, the method, comprising:
    obtaining usage data by monitoring the user's usage of the first device which is in a first home network, wherein the usage data comprises data on the user's usage of selecting a first function of the first device;
    converting the usage data into a format that can be understood by a second device to generate metadata regarding the user's usage of selecting the first function of the first device; and
    transmitting the metadata to a first metadata collecting device in the first home network;
    in response to the first metadata collecting device receiving a request for the metadata from a second metadata collecting device connected to the second device of a second home network which is different from the first home network, transmitting the metadata by the first metadata collecting device in the first home network to the second device via the second metadata collecting device in the second home network in order to share the usage data with the second device, wherein the second device analyzes the received metadata to perform an operation corresponding to the metadata and the operation comprises selecting a second function of the second device, and wherein the second function coincides with the first function of the first device.

2. The method of claim 1, wherein the metadata is transmitted from the first metadata collecting device to the second metadata collecting device in a streaming mode, and the second device performs the second function in real-time.

3. The method of claim 1, wherein the metadata includes information about an electronic device.

4. The method of claim 1, further comprising storing the metadata in the first metadata collecting device prior to transmitting the metadata from the first metadata collecting device to the second metadata collecting device in the second home network.

5. The method of claim 1, further comprising determining whether the request for the metadata from the second home network is received.

6. A method of sharing a user's usage of a first device, the method comprising:
    receiving, by a second device, metadata about usage data from a first metadata collecting device in a first home network via a second metadata collecting device in a second home network, wherein the first home network includes the first device and the second home network includes the second device, wherein the usage data comprises data on the user's usage of selecting a first function of the first device, and the metadata is generated by converting the user's usage data into a format that can be understood by the second device; and
    analyzing the received metadata regarding the user's usage of selecting the first function of the first device to perform an operation corresponding to the metadata, wherein the operation comprises selecting a second function of the second device, and wherein the second function coincides with the first function of the first device.

7. The method of claim 6, wherein the metadata is received using one of broadcast mode, multicast mode, and unicast mode.

8. The method of claim 6, wherein the analyzing the metadata comprises at least one of parsing the metadata and decoding the metadata.

9. The method of claim 6, further comprising judging whether the second device and the first device are of the same kind.

10. The method of claim 6, wherein the metadata is generated using the first device in the first home network.

11. The method of claim 6, wherein the metadata is generated by the first device.

12. A system of sharing human behavior, the system comprising:
    a first home network comprising at least one first electronic device configured to generate metadata about usage data of the at least one first electronic device in the first home network, wherein the usage data comprises data on the user's usage of selecting a first function of the at least one first electronic device, and the metadata is generated by converting the user's usage data into a format that can be understood by at least one second electronic device;

a second home network different from the first home network, the second home network comprising the at least one second electronic device;

a first collecting device in the first home network, the first collecting device configured to collect the metadata from the first home network and store the metadata; and a second collecting device in the second home network, the second collecting device configured to, in response to receiving a request for the metadata from the at least one second electronic device, transmit the request to the first collecting device, receive the metadata of the first home network from the first collecting device, and transmit the metadata to the second home network in order to share the usage data with the at least one second electronic device wherein the at least one second electronic device is configured to receive the metadata regarding the user's usage of selecting the first function of the at least one first electronic device from the second collecting device and analyze the received metadata to perform an operation corresponding to the metadata, and wherein the operation comprises selecting a second function of the second device, and the second function coincides with the first function of the at least one first electronic device.

13. The system of claim 12, wherein the at least one first electronic device of the first home network comprises at least one of a first illumination system, a first audio/video (A/V) player, a first A/V recorder, a first personal computer, a first scent generating device, a first heating/cooling controller, and a first vibration generating device and the at least one second electronic device of the second home network comprises at least one of a second illumination system, a second A/V player, a second A/V recorder, a second personal computer, a second scent generating device, a second heating/cooling controller, and a second vibration generating device.

14. The system of claim 12, wherein the first electronic device comprises at least one of a monitoring unit, a metadata generating unit, a metadata transmitting/receiving unit, a metadata analyzing unit, and an operation performance controlling unit.

15. The system of claim 12, wherein the first metadata collecting device comprises at least one of a metadata transmitting and receiving unit, a metadata storing unit, a metadata managing unit, and a network interface.

16. A non-transitory computer-readable medium having embodied thereon a program for executing a method of providing metadata, wherein the method comprises:

obtaining usage data by monitoring a user's device usage of the first device which is in a first home network, wherein the usage data comprises data on the users usage of selecting a first function of the first device;

converting the usage data into a format that can be understood by a second device, to generate metadata regarding the users usage of selecting the first function of the first device; and transmitting the metadata, to a first metadata collecting device in the first home network;

in response to the first metadata collecting device receiving a request for the metadata from a second metadata collecting device connected to a second device of a second home network which is different from the first home network, transmitting the metadata by the first metadata collecting device in the first home network to the second device via the second metadata collecting device in the second home network in order to share the usage data with the second device, wherein the second device analyzes the received metadata to perform an operation corresponding to the metadata and the operation comprises selecting a second function of the second device, and wherein the second function coincides with the first function of the first device.

17. A non-transitory computer-readable recording medium having embodied thereon a program for executing a method of sharing a user's usage of a first device which is in a first home network, wherein the method comprises:

receiving, by a second device, metadata about usage data from a first metadata collecting device in a first home network via a second metadata collecting device in a second home network, wherein the first home network includes the first device and the second home network includes the second device, wherein the usage data comprises data on the user's usage of selecting a first function of the first device, and the metadata is generated by converting the user's usage data into a format that can be understood by the second device, and wherein the metadata includes information about at least one of a category, a manufacturer, a model name, and a serial number of the first device in the first home network; and analyzing the received metadata regarding the user's usage of selecting the first function of the first device to perform an operation corresponding to the metadata wherein the operation comprises selecting a second function of the second device, and wherein the second function coincides with the first function of the first device.

18. The method according to claim 1, wherein the metadata comprises a name of the first function of the first device.

19. An apparatus of providing metadata regarding a user's usage of a first device, the apparatus comprising:

a controller configured to:

obtain usage data by monitoring the user's usage of the first device which is in a first home network, wherein the usage data comprises data on the user's usage of selecting a first function of the first device, and convert the usage data into a format that can be understood by a second device, to generate metadata regarding the user's usage of selecting the first function of the first device; and a transmitter configured to transmit the metadata to a first metadata collecting device in the first home network, wherein, in response to the first metadata collecting device receiving a request for the metadata from a second metadata collecting device connected to the second device of a second home network which is different from the first home network, the first metadata collecting device transmits the metadata to the second device via the second metadata collecting device in the second home network in order to share the usage data with the second device, wherein the second device analyzes the received metadata to perform an operation corresponding to the metadata and the operation comprises selecting a second function of the second device, and wherein the second function coincides with the first function of the first device.

20. The method of claim 1, wherein the usage data comprises pattern data regarding the user's use of the first device.

21. The method according to claim 1, wherein a user of the second home network is in a different geographic location than the user of the first home network.

22. The method according to claim 1, wherein the usage data of the user in the first home network is broadcast to the second home network.

\* \* \* \* \*